United States Patent [19]

Madden

[11] 4,392,615

[45] Jul. 12, 1983

[54] VIOL EXHAUST NOZZLE WITH VEER FLAP EXTENSION

[75] Inventor: William M. Madden, Palm Springs, Fla.

[73] Assignee: United Technologies Corporation, Hartford, Conn.

[21] Appl. No.: 262,367

[22] Filed: May 11, 1981

[51] Int. Cl.$^3$ ............................................. F02K 1/12
[52] U.S. Cl. .............................. 239/265.37; 244/12.5
[58] Field of Search ..................... 239/265.33–265.41; 60/232; 244/23 D, 12.5, 207, 110 B

[56] References Cited

U.S. PATENT DOCUMENTS

| 4,000,610 | 1/1977 | Nash et al. | 60/232 X |
| 4,000,612 | 1/1977 | Wakeman et al. | 239/265.35 X |
| 4,000,854 | 1/1977 | Konarski et al. | 239/265.35 |
| 4,013,226 | 3/1977 | Willard | 239/265.37 X |
| 4,175,385 | 11/1979 | Nash | 239/265.37 X |

Primary Examiner—John J. Love
Assistant Examiner—Paul A. Sobel
Attorney, Agent, or Firm—Stephen E. Revis

[57] ABSTRACT

A gas turbine engine exhaust nozzle assembly having vertical thrust capability comprises a two-dimensional converging/diverging nozzle and a veer flap for forward thrust operation and a rotatable hood type deflector for vertical thrust operation, wherein the forward edge of the veer flap is attached to the downstream edge of the deflector hood. During forward thrust operation, the hood and rear edge of the divergent flap portion of the converging/diverging nozzle are moved synchronously to maintain the rear edge of the divergent flap portion and the front edge of the veer flap adjacent each other such that the veer flap is aligned with and acts as an extension of the divergent flap portion of the converging/diverging nozzle. Preferably, means are provided to independently trim the orientation of the veer flap to maximize thrust. A movable ventral flap defines the nozzle throat between itself and the deflector hood when the hood is deployed for vertical thrust.

7 Claims, 4 Drawing Figures

VIOL EXHAUST NOZZLE WITH VEER FLAP EXTENSION

DESCRIPTION

TECHNICAL FIELD

This invention relates to convergent/divergent exhaust nozzles for gas turbine engines.

BACKGROUND ART

Two-dimensional convergent/divergent variable area exhaust nozzles with a veer flap extension for added thrust and control during forward flight and a deflector hood for redirecting the exhaust gases downwardly during short or vertical takeoffs are known in the art. One such nozzle is described in U.S. Pat. No. 3,979,067 to D. O. Nash. In that patent the forward thrust gas flow path is formed between a pair of upper flaps and a lower ventral flap. The upper flaps comprise an upstream flap, which pivots about a fixed axis at its upstream end, and a downstream flap which pivots about a fixed axis at its downstream end. The rear end of the upstream flap is joined to the forward end of the downstream flap by a cam and roller connection which allows that joint to move toward and away from the engine axis to vary the nozzle throat. One drawback to this arrangement is that the diverging angle of the downstream flap gets considerably steeper as the nozzle throat area becomes smaller. This may limit the possible turndown ratio (maximum throat area to minimum throat area) due to the boundary layer separating from the downstream flap.

The ventral flap of the Nash nozzle provides throat area control during both forward and vectored thrust. However, since the hood and ventral flap pivot about the same axis, the ventral flap defines an essentially constant (i.e., unvarying) throat area between itself and the hood for all hood positions during thrust vectoring. This is an undesirable limitation.

Other patents which may be of more general interest as regards the state of the art are: U.S. Pat. No. 2,969,641 which shows translating/pivoting flaps for a three-dimensional nozzle for an outer annular secondary air flow; U.S. Pat. No. 3,367,579 which shows free floating translating/rotating divergent flaps for a three-dimensional convergent/divergent nozzle; and, U.S. Pat. No. 4,000,854 which shows a two-dimensional variable area convergent/divergent nozzle having an upper downstream flap pivotally connected at its forward end to the rearward end of a converging upstream flap, and having its rearward end pivotally connected to the downstream end of an outer airplane flap whose movement controls the angular orientation of the downstream flap. None of the foregoing utilize deflector hoods for thrust vectoring. A ventral-type flap which both translates and rotates to vary the throat area of a two-dimensional nozzle is shown in U.S. Pat. No. 4,013,226 to C. M. Willard.

DISCLOSURE OF INVENTION

One object of the present invention is an improved two-dimensional variable area converging/diverging exhaust nozzle.

Another object of the present invention is an improved two-dimensional variable area converging/diverging exhaust nozzle having an extended expansion surface and vertical thrust capability.

Accordingly, an exhaust nozzle assembly with vertical thrust capability comprises a variable position two-dimensional converging/diverging nozzle cooperating with a veer flap having a forward edge attached to the downstream edge of a rotatable hood-type deflector wherein the rear edge of the upper diverging flap of the converging/diverging nozzle rotates about the same axis as the deflector hood, including means for maintaining the said rear edge of the upper diverging flap and the said forward edge of the veer flap adjacent each other during all forward flight positions of the converging/diverging nozzle, and means for orienting the veer flap such that it acts as an extension of the said upper diverging flap.

During forward flight the deflector hood is out of the engine gas path and is above the upper flaps of the converging/diverging nozzle. It is, however, rotated while stowed, such that its rear edge, to which the veer flap is attached, is maintained adjacent the rear edge of the upper diverging flap of the converging/diverging nozzle as said diverging flap rear edge moves. The veer flap extends downstream from the hood and the position of its rear edge is controlled by suitable means such that the surface of the veer flap provides a substantially smooth extension of the expansion surface of the upper diverging flap. Preferably the veer flap rear edge can be oriented independently of the position of the converging/diverging nozzle to trim the orientation of the veer flap extension surface to achieve maximum thrust. When the hood is deployed for vertical thrust operation the veer flap rotates to a position behind the hood out of the gas flow path. In that mode, in a preferred embodiment, the rear edge of the lower or ventral flap of the converging/diverging nozzle cooperates with the deflected hood to define the throat area of the nozzle.

A preferred converging/diverging nozzle for use in the above-described exhaust nozzle assembly is described herein and claimed separately in commonly owned copending U.S. Ser. No. 262,368, filed May 11, 1981, titled "Improved Variable Area Two-Dimensional Converging/Diverging Nozzle" by William M. Madden filed on even date herewith.

The foregoing and other objects, features and advantages of the present invention will become more apparent in the light of the following detailed description of the preferred embodiments thereof as shown in the accompanying drawing.

BEST MODE FOR CARRYING OUT THE INVENTION

Figure 1:
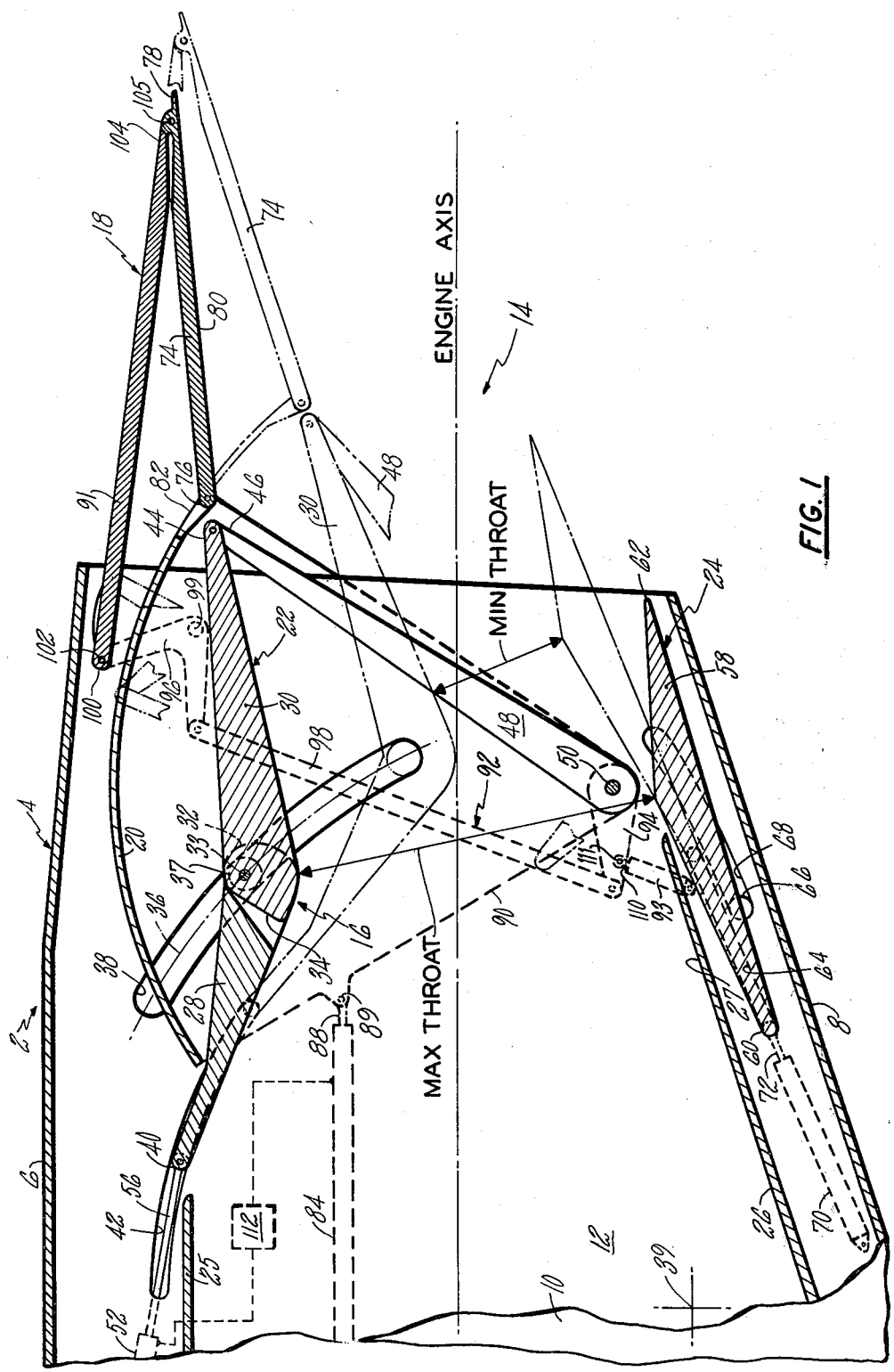
FIG. 1 is a schematic cross-sectional view of an exhaust nozzle assembly according to the present invention shown in a forward thrust mode.
Figure 2:
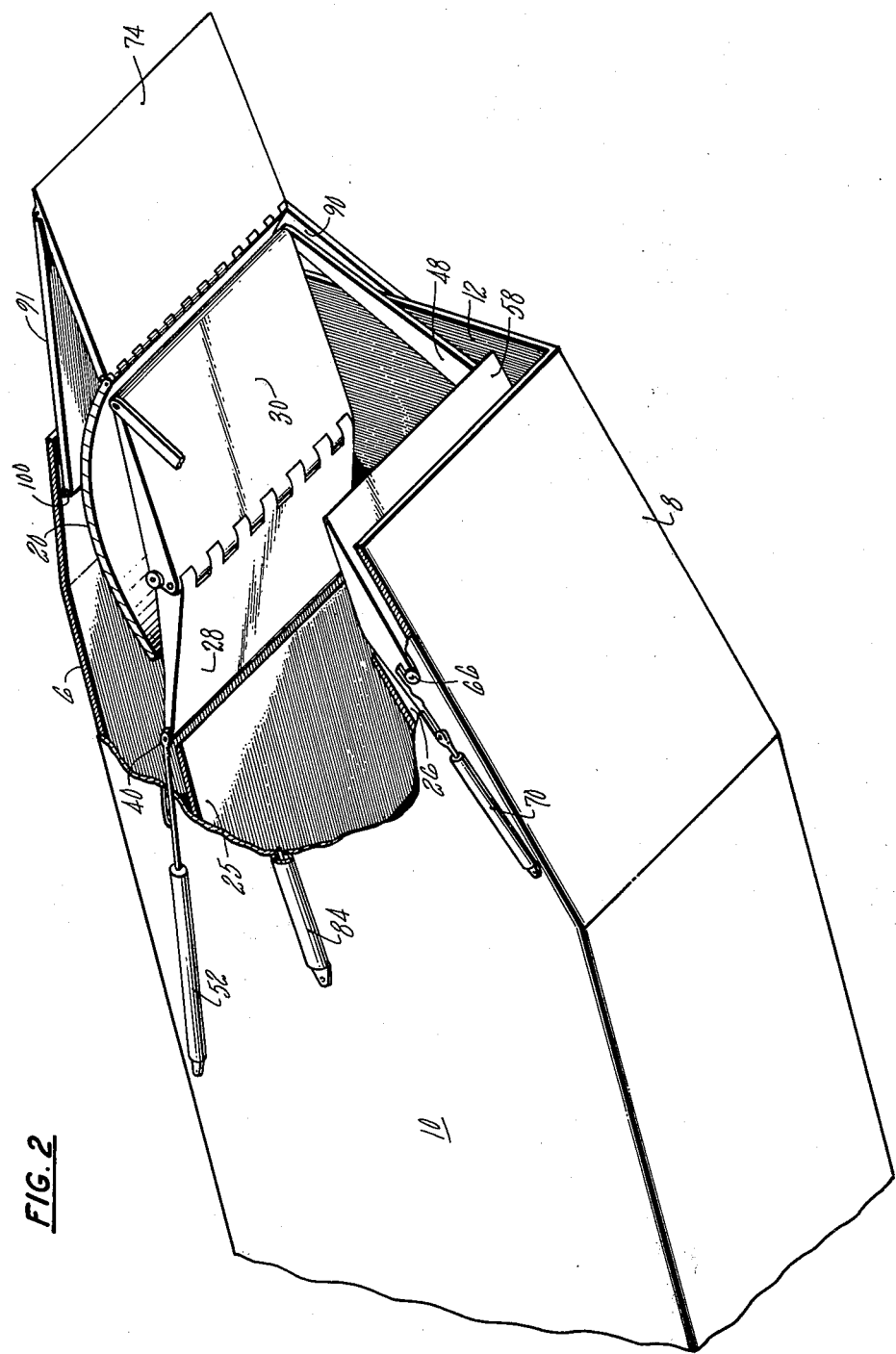
FIG. 2 is a perspective view, partly cut away, of the nozzle assembly of FIG. 1.

Referring to FIGS. 1 and 2, an exhaust nozzle assembly for a gas turbine engine is generally referred to by the reference numeral 2, and includes engine exhaust duct means 4 having opposed top and bottom walls 6, 8, respectively, side walls 10, 12, and upper and lower duct liners 25, 26. Disposed within and attached to the exhaust duct means 4 is an exhaust nozzle device 14. The exhaust nozzle device 14 includes a variable area converging/diverging nozzle 16, an external expansion device 18, and a hood-type deflector 20 to redirect the exhaust gas flow downwardly for vertical or short takeoffs. The nozzle assembly 2 of FIG. 1 is shown in its maximum throat area (solid lines) and minimum throat area (phantom lines) forward thrust positions. FIG. 2 is a perspective view of the nozzle assembly in its maximum throat area forward thrust position.

The converging/diverging nozzle 16 comprises upper flap means 22 and lower flap means 24. The upper and lower flap means 22, 24, in conjunction with the upper and lower duct liners 25, 26 and the side walls 10, 12, define an exhaust nozzle gas flow path 27. The upper flap means 22 includes an upstream flap 28 and a downstream flap 30. The rear edge 32 of the upstream flap 28 is hinged along an axis 33 to the front edge 34 of the downstream flap 30. The axis 33 is movable along an arc 36 by means of rollers 37 disposed on each side of the upper flap means 22 and which ride in tracks 38 in the side walls 10, 12. The forward edge 40 of the upstream flap 28 rides on rollers in arcuate tracks 42 in the side walls 10, 12. The rear edge 44 of the downstream flap 30 is pivotally connected to the ends 46 of a pair of follower links 48 disposed adjacent the side walls 10, 12. The follower links are pivotally mounted to the side walls for rotation about a fixed axis 50.

In this embodiment the tracks 38, 42 constrain the forward and rearward edges 40, 32 of the upstream flap 28 to move in circular arcs about a common center 39. This helps balance pressure loads on the flap 28 to minimize moments. Other track shapes may, however, be used wherein as the converging/diverging nozzle 16 is moved from a maximum to minimum throat area position, the forward edge 40 of the upstream flap moves downstream (but not necessarily parallel to the engine axis) while the rearward edge 32 moves downstream and toward the engine axis to a point below its original position while the flap 28 maintains a converging angle with respect to the engine axis.

The lower flap means 24, in this embodiment, comprises a single ventral flap 58 extending between the side walls 10, 12 and having a front edge 60 and rear edge 62. The front edge 60 of the ventral flap 58 is movable upstream and downstream within straight tracks 64 in the side walls 10, 12. Rollers 66 attached to the ventral flap 58 between its front and rear edges 60, 62 ride in curved cam tracks 68 in the side walls 10, 12.

Positioning of the upper flap means 22 is accomplished by means of a pair of first actuators 52, one actuator of said pair being pivotally connected to the side wall 10 and the other (not shown) being pivotally connected to the side wall 12. An actuation rod 56 of each actuator 52 is pinned to the forward edge 40 of the upstream flap 28, and its movement controls the position of the forward edge 40 within the track 42 and thus the position of the upper flap means 22.

A pair of spaced apart second actuators 70 mounted on the side walls 10, 12 have their actuation rods 72 pinned to the forward edge 60 of the ventral flap 58 and move the forward edge 60 within the tracks 64. The tracks 64, 68 along with the position of the actuation rods 72 control the position and orientation of the ventral flap, which moves both upstream and downstream as well as toward and away from the engine axis.

From the foregoing it is apparent that the upper flap means 22 and the lower flap means 24 cooperate with each other to vary the throat and exit area of the converging/diverging exhaust nozzle flow path 27. As can be seen by comparing the maximum and minimum forward thrust throat areas, the linkage defining the upper flap means 22 offers the advantage of providing a very large turndown ratio, while maintaining a relatively shallow diverging flap (30) angle. Thus, this configuration avoids the need for a long diverging flap to reduce flap angle and prevent boundary layer separation.

Cooperating with the variable area converging/diverging nozzle 16 is the external expansion device 18. The expansion device 18 includes a veer flap 74 having a front edge 76, a rear edge 78, and an expansion surface 80. The front edge 76 is pivotally connected to the rear edge 82 of the deflector 20 and is parallel to the rear edge 44 of the downstream flap 30. A pair of third actuators 84 (only one being shown) are pivotally mounted to the exhaust duct means side walls 10, 12, respectively. The actuation rods 88 of the actuators 84 are pinned at 89 to side wall panels 90 of the deflector 20. The position of the front edge 76 of the veer flap 74 is thereby controlled by the position of the deflector 20 which is rotated about the axis 50 by the third actuators 84.

The position of the rear edge 78 of the veer flap 74, and thus the angular orientation of the expansion surface 84, is independently adjustable by linkage means comprising an airplane flap 91, a four bar linkage 92 adjacent each side wall 10, 12, and a pair of fourth actuators 93 (only one being shown) pivotally mounted to the side walls. Each four bar linkage 92 comprises a lower drive crank 94, an upper follower crank 96, and a connecting rod 98. The front edge 100 of the airplane flap 91 is pivotally connected along an axis 102 to the upper cranks 96; and the rear edge 104 of the airplane flap 91 is pivotally connected to the rear edge 78 of the veer flap 74 along an axis 105. The lower cranks 94 pivot about the fixed axis 50, while the upper cranks 96 are each pivotally mounted to the exhaust duct means 4 through a cantilevered support bracket 108 (FIG. 4) so as to rotate about a fixed axis 99. Actuation rods 110 of the actuators 93 are pinned at 111 to the lower cranks 94. Thus, the fourth actuators 93, in conjunction with the hood actuators 84, control the position of the rear edge 78 of the veer flap 74.

During forward thrust operation the throat area of the exhaust nozzle flow path 27 is controlled by the position of the first and second actuators 52, 70. The third actuators 84, which rotate the deflector 20, are synchronized with the first actuators 52 such that the front edge 76 of the veer flap 74 remains adjacent the rear edge 44 of the downstream flap 30. Synchronization may be provided by any suitable control means 112 interconnecting these actuators. Simultaneously, or at any other time, the fourth actuators 93 adjust the position of the rear edge 78 of the veer flap 74 to trim the position of expansion surface 80 in order to maximize thrust. Throughout this possible limited movement of the deflector 20 during forward thrust operation the deflector 20 is considered to be stowed since it is above the upper flap means 22 and out of the gas path.

Note that if the converging/diverging nozzle 16 shown in the drawing were to be used without an expansion device 18, there would be no requirement that the rearward edge 44 of the downstream flap 30 move in a circular arc. In that case any motion which would still provide the converging/diverging nozzle 16 with the benefit of a large turndown ratio without separation of the boundary layer from the surface of the downstream flap 30, would be acceptable. Preferably such movement will be from a first position wherein the downstream flap forms a diverging angle with respect to the engine axis, to a second position wherein its downstream edge is further downstream and below its first position. The object is to reduce the throat area while preventing the diverging angle from becoming too steep as the forward edge of the downstream flap moves closer to the engine axis.

Figure 3:
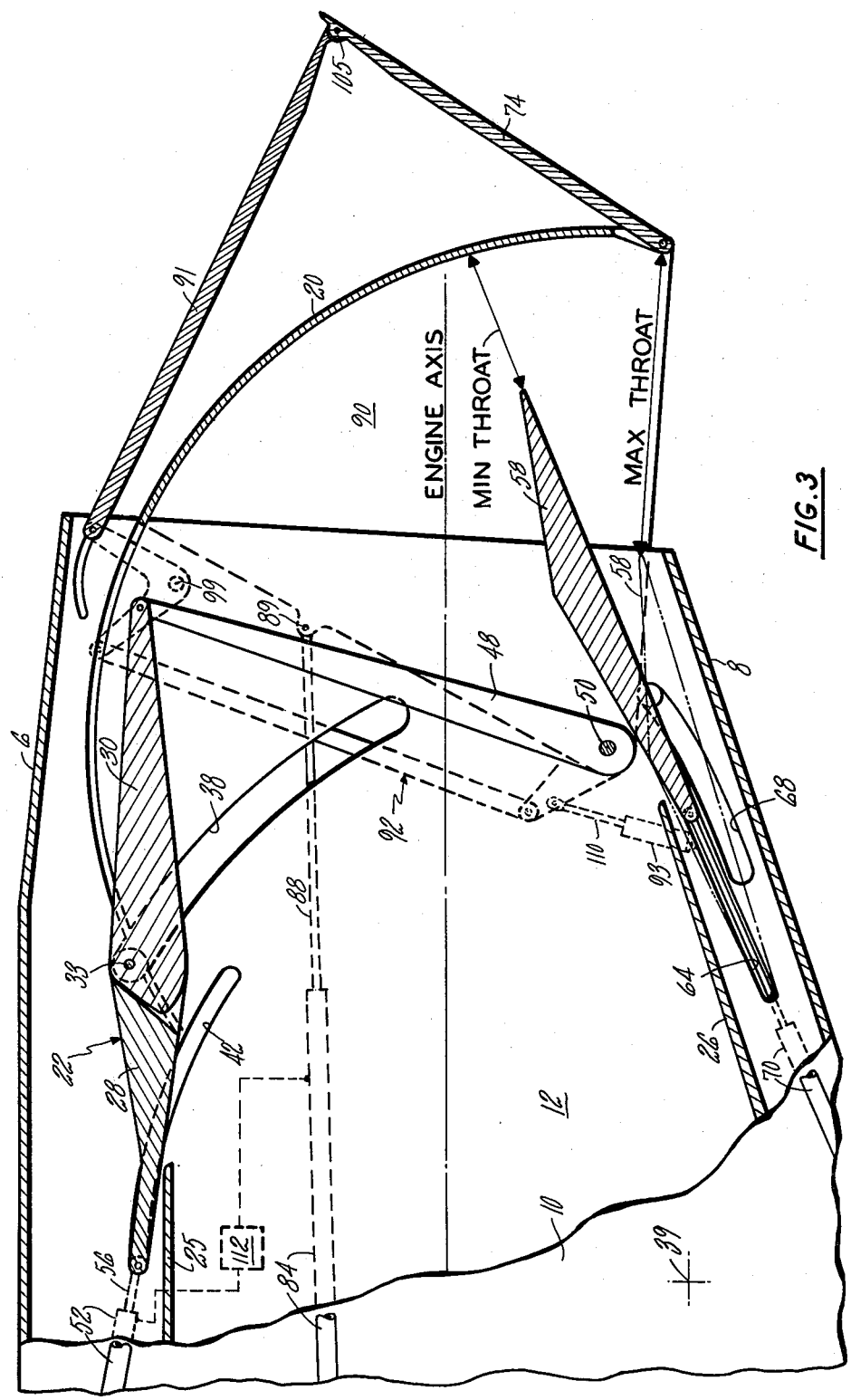
FIG. 3 is a schematic cross-sectional view of the exhaust nozzle assembly of FIG. 1 shown in a vertical thrust mode.
Figure 4:
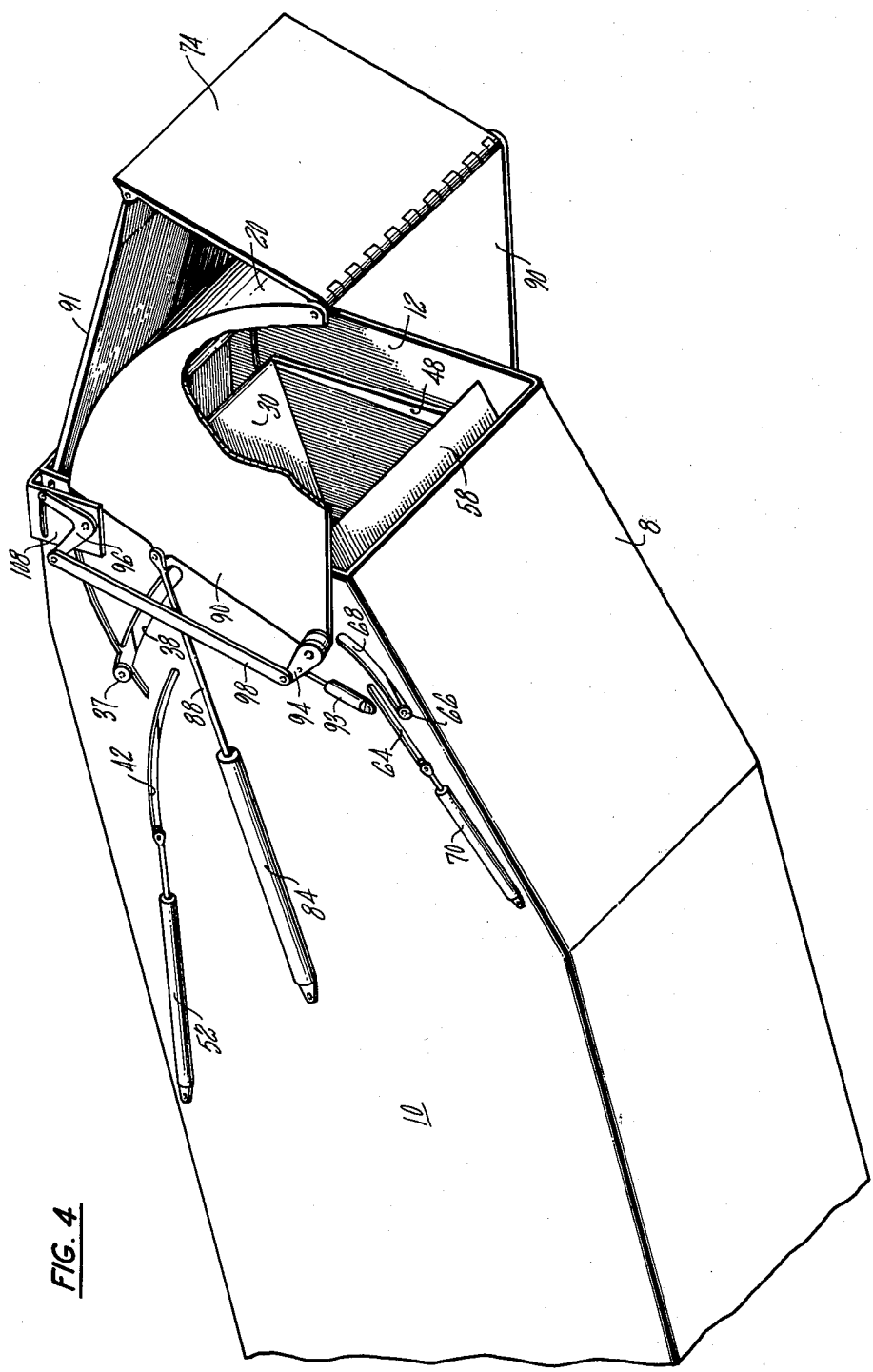
FIG. 4 is a perspective view, partly cut away, of the nozzle assembly in the vertical thrust mode.

Referring to the cross section of FIG. 3 and the perspective view of FIG. 4, for vertical thrust the deflector 20 is rotated clockwise to its deployed position wherein it deflects the exhaust gases in a downward direction. Because it is undesirable to turn supersonic flow inside the exhaust nozzle assembly 2, during vertical thrust the upper flap means 22 is moved to its most open position (shown in FIG. 3) used only during vectored thrust to maximize the cross-sectional area of the flow path 27 within the converging/diverging nozzle 16. When in that position the rear edge 62 of the ventral flap 58, in combination with the deflector 20, defines the nozzle throat area, which may be varied by actuation of the ventral flap 58. FIG. 3 shows the minimum (solid lines) and maximum (phantom lines) throat areas for the vertical thrust mode. In FIG. 4 the ventral flap 58 is shown fully retracted to define the maximum throat area for vertical thrust. Also, in the vertical thrust mode the airplane flap 91 and the veer flap 74 define an external surface for the downstream end of the exhaust nozzle assembly 2.

It will be apparent to those persons having ordinary skill in the art that many variations and modifications may be made to the exhaust nozzle assembly 2 while remaining within the scope of the present invention. For example, because the tracks 38, 42 have the same center of curvature, they may be replaced by a link rigidly attached to the upstream flap 28 and pivotally attached to the exhaust duct means 4 along the axis 39. A four bar linkage would thereby be formed consisting of this link (including the upstream flap), the follower link 48, and the downstream flap 30; and rotation of the four bar linkage by an actuator would result in motion of the upper flap means 22 which is identical to the motion which occurs using the tracks 38, 42.

It is also possible to eliminate the fourth actuators 93 by coupling the lower crank 94 to the follower link 48 so they rotate together at least through forward thrust positions of the upper flap means 22. Appropriate selection of the lengths of the cranks 94, 96, the connecting rod 98, and the airplane flap 91 can provide a fixed schedule of orientation for the expansion surface 80 such that it is always substantially aligned with the surface of the downstream flap 30; however, the ability to trim the orientation of the expansion surface 80 would be lost.

It is also possible to eliminate the four bar linkage 92 comprising the cranks 94, 96 and the connecting rod 98. Instead, a separate actuator mounted to the inside of the top wall 6 of the exhaust duct means 4 may have its actuator rod connected directly to the front edge 100 of the airplane flap 91 and could be used to trim the position of the veer flap 74.

It should also be apparent from the foregoing description of the present invention that the expansion device 18 in combination with the deflector 20 may be used with any variable area two-dimensional converging/diverging nozzle having a downstream upper flap with a rear edge which moves in a circular arc about the same fixed axis as the axis about which the hood rotates.

Although the invention has been shown and descried with respect to a preferred embodiment thereof, it should be understood by those skilled in the art that other various changes and omissions in the form and detail thereof may be made therein without departing from the spirit and the scope of the invention.

I claim:

1. A two-dimensional variable area exhaust nozzle assembly for a gas turbine engine having forward and vertical thrust capability including:

convergent/divergent variable position exhaust nozzle means including exhaust duct means having opposed side walls, and movable upper and lower flap means disposed between said side walls, said exhaust duct means and upper and lower flap means defining a converging/diverging exhaust gas flow path, said upper flap means including a downstream flap having an exhaust gas expansion surface and a fore and an aft edge, said aft edge being movable from a first to a second forward thrust position in a circular arc about a fixed axis parallel to said aft edge;

deflector hood means rotatable in a circular arc about said fixed axis between a plurality of stowed positions wherein it is above said upper flap means external to the gas flow path and a deployed position downstream of said upper flap means in said gas flow path to deflect exhaust gases in a downward direction, said hood means having rear edge parallel to said downstream flap aft edge;

a veer flap having a front edge, a rear edge, and a gas directing surface, said veer flap being pivotally connected at its front edge to said hood means rear edge and, during forward thrust operation of said nozzle assembly, extending in a generally downstream direction;

first actuation means operatively connected to said convergent/divergent nozzle means, to said hood means, and to said veer flap for positioning said convergent/divergent nozzle means, said hood means, and said veer flap, including control means for rotating said hood means to continuously maintain the position of said front edge of said veer flap adjacent said aft edge of said downstream flap during forward thrust operation of said nozzle assembly, wherein during forward thrust operation said gas directing surface of said veer flap acts as an extension of said downstream flap expansion surface.

2. The exhaust nozzle assembly according to claim 1, wherein said lower flap means comprises a ventral flap having a rear edge parallel to said hood means rear edge, said nozzle assembly including ventral flap actuation means for moving said ventral flap rear edge toward and away from said hood means when said hood means is in a deployed position to vary the exit area of said nozzle assembly in the vertical thrust mode.

3. The exhaust nozzle assembly to claim 2, wherein the exit area is the throat area of said nozzle assembly in the vertical thrust mode.

4. The exhaust nozzle assembly according to claim 3, wherein for all forward thrust positions of said exhaust nozzle means said veer flap is independently pivotable about said hood means rear edge to permit trimming the orientation of said veer flap.

5. The exhaust nozzle assembly according to claims 3 or 4, wherein said first actuation means includes an airplane flap disposed above said veer flap during forward thrust operation of said nozzle assembly and having a rear edge pivotally attached to said veer flap downstream of said veer flap front edge, said first actuation means including means operatively connected to said airplane flap for moving said airplane flap to orient said veer flap.

6. The exhaust nozzle assembly according to claim 2, wherein said ventral flap actuation means includes means for moving said ventral flap toward and away from said upper flap means during forward thrust operation of said nozzle assembly to vary the throat area of said exhaust nozzle means during forward thrust.

7. The exhaust nozzle assembly according to claims 3, 4 or 6 wherein said upper flap means includes an upstream flap having a gas path surface converging toward said ventral flap, said upstream flap having fore and aft edges movable in a downstream direction, said aft edge being hinged to said fore edge of said downstream flap and being constrained to move from a maximum throat area forward thrust position to a point downstream thereof and closer to the engine axis to define a reduced throat area forward thrust position.

* * * * *